United States Patent [19]
Brown, III

[11] Patent Number: 5,520,584
[45] Date of Patent: May 28, 1996

[54] BICYCLE CHAIN COVER

[75] Inventor: Thomas G. Brown, III, 1801 Francisco, Berkeley, Calif. 94703

[73] Assignee: Thomas G. Brown, III, Berkeley, Calif.

[21] Appl. No.: 341,648

[22] Filed: Nov. 17, 1994

[51] Int. Cl.⁶ .......................... B62J 13/04; B65D 65/04; B65D 85/68
[52] U.S. Cl. ............................ 474/146; 150/167
[58] Field of Search .................... 474/144, 146; D12/127; 150/167

[56] References Cited

U.S. PATENT DOCUMENTS

| | | | |
|---|---|---|---|
| D. 323,309 | 1/1992 | Perry | D12/127 |
| D. 348,860 | 7/1994 | Reynolds | D12/114 |
| 3,162,062 | 12/1964 | Jacoby | 474/146 |
| 3,309,954 | 3/1967 | Phillips et al. | |
| 3,927,578 | 12/1975 | Mattila | 474/146 |
| 4,632,416 | 12/1986 | Zelentz | 474/146 |
| 5,018,564 | 5/1991 | Anglin | 474/146 |
| 5,062,560 | 11/1991 | Wasden | 224/328 |
| 5,312,303 | 5/1994 | Hinschlager | 474/146 |

*Primary Examiner*—Roger J. Schoeppel

[57] ABSTRACT

A removable flexible chain cover assembly for enclosing the drivetrain of a bicycle during storage and transport and protecting the surroundings from contact with the grease and dirt and sharp components of the drivetrain.

13 Claims, 4 Drawing Sheets

BICYCLE CHAIN COVER

BACKGROUND OF THE INVENTION

The present invention relates to devices for covering bicycle drive train. More specifically, the invention comprises a removable fabric cover for enclosing the entire drivetrain to protect adjacent objects and people from the grease and dirt on the drivetrain and from the sharp pans of the drivetrain.

Bicycles spend far more time in storage or passive transport than in actual use. Storage and transport can pose problems for the bicycle user, due primarily to the drivetrain components of the bicycle. The chain, gear wheels, and gear cluster require lubrication, and the grease and dirt on these components can soil any nearby object merely by casual contact. In addition, the sharp points of the gear components can pose a hazard to clothing, carpeting, and other objects than may come in contact with the drivetrain.

It would be advantageous to protect and insulate the surroundings from contact with the drivetrain of a bicycle during transport or storage. However, the prior art is devoid of any device for this purpose.

SUMMARY OF THE PRESENT INVENTION

The present invention generally comprises a removable flexible cover assembly for enclosing the drivetrain of a bicycle during storage and transport and protecting the surroundings from contact with the grease and dirt and sharp components of the drivetrain.

In one aspect, the flexible cover assembly comprises an oblong bag-like enclosure dimensioned to extend about the drivetrain components of a bicycle. The enclosure includes an opening and means for constricting the opening to secure the enclosure about the front gear wheel and rear gear or gear cluster. The constricting means may include ties, fabric fasteners, or elastic material secured to the opening.

In another aspect, the invention comprise a continuous sidewall having a first continuous edge secured to a side panel to define a bag-like enclosure dimensioned to extend about the bicycle drive train. The second continuous edge of the sidewall defines an opening, and includes elastic members secured to portions thereof, whereby the opening may be stretched to extend about the front and rear gear assemblies of the bicycle. The elastic tension constricts the opening so that the opening is smaller in circumference than the remainder of the enclosure, and the opening is retained about the gear assemblies to enclose the drivetrain. Furthermore, this construction permits the chain cover to be used with a wide variety of bicycle sizes and drivetrain configurations.

In a further aspect, tab portions or a skirt are secured to the opening of the enclosure tier manual grasping, whereby the enclosure may be secured or removed without touching greasy portions of the drivetrain or the enclosure itself.

When not in use, the chain cover may be folded or otherwise compressed into a small package for handling and transport.

DESCRIPTION OF THE PREFERRED EMBODIMENT

Figure 1:
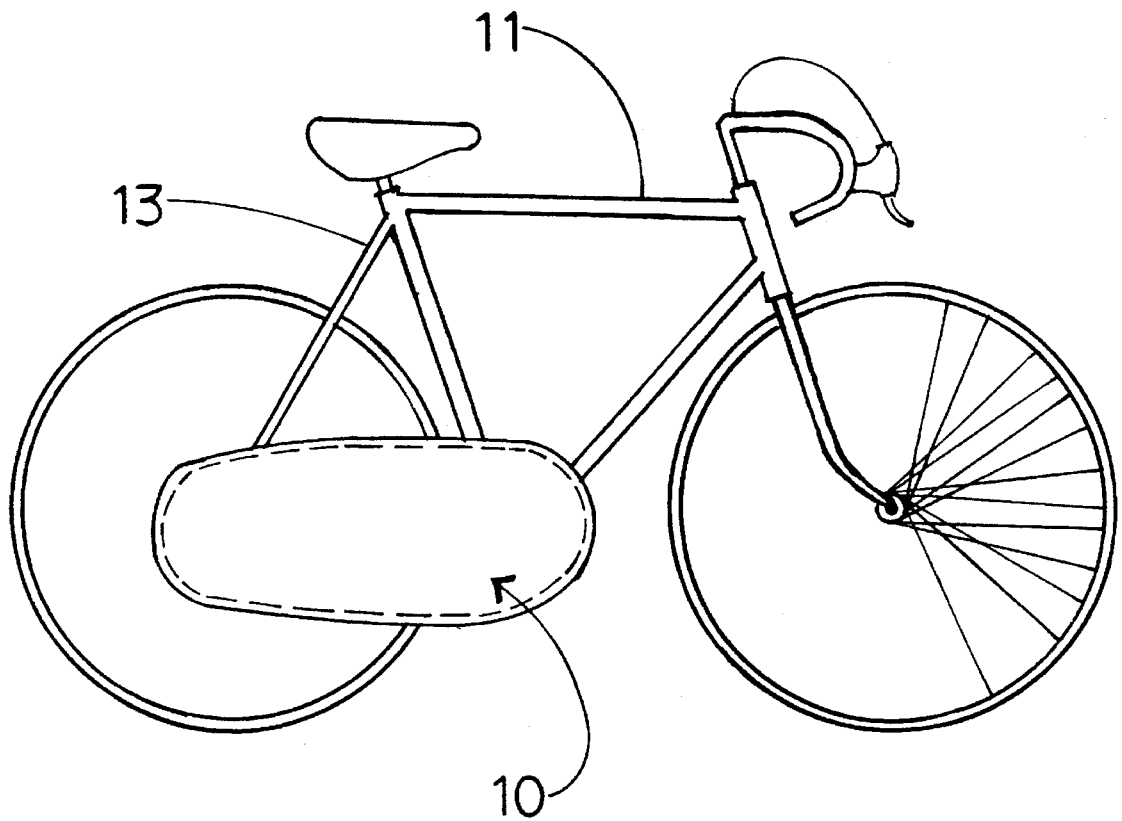
FIG. 1 is a side elevation showing the chain cover of the present invention secured to the drivetrain of a typical bicycle.
Figure 2:
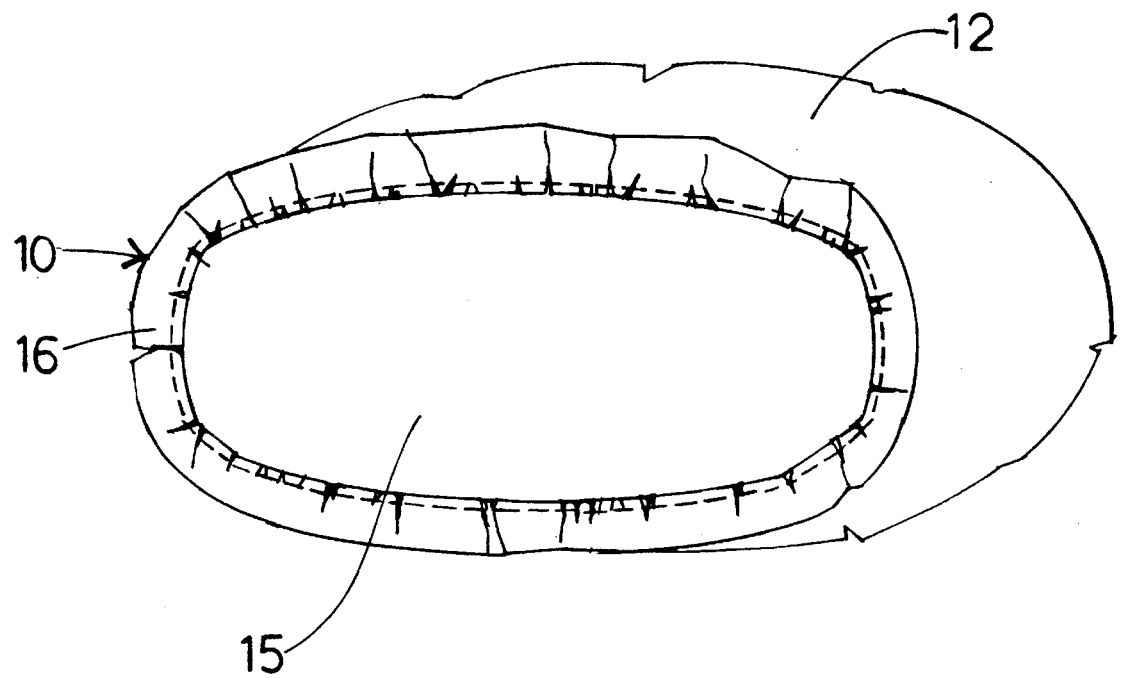
FIG. 2 is a perspective view of the chain cover of the present invention.
Figure 3:
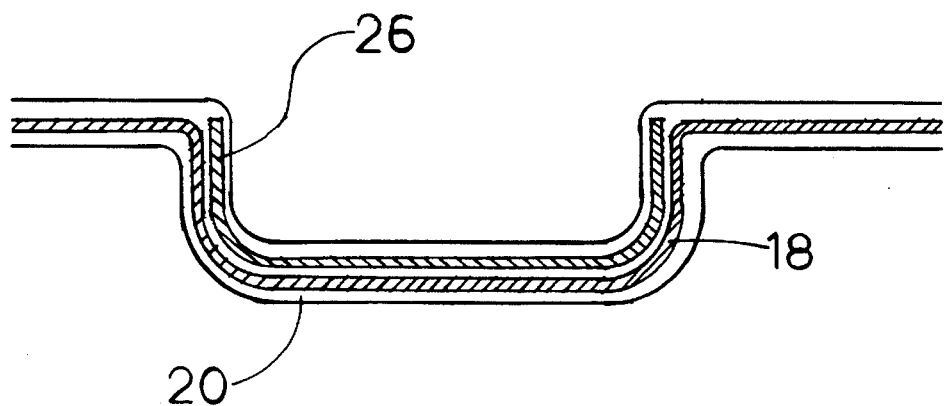
FIG. 3 is an enlarged cross-sectional view of a further embodiment of the chain cover.
Figure 4:
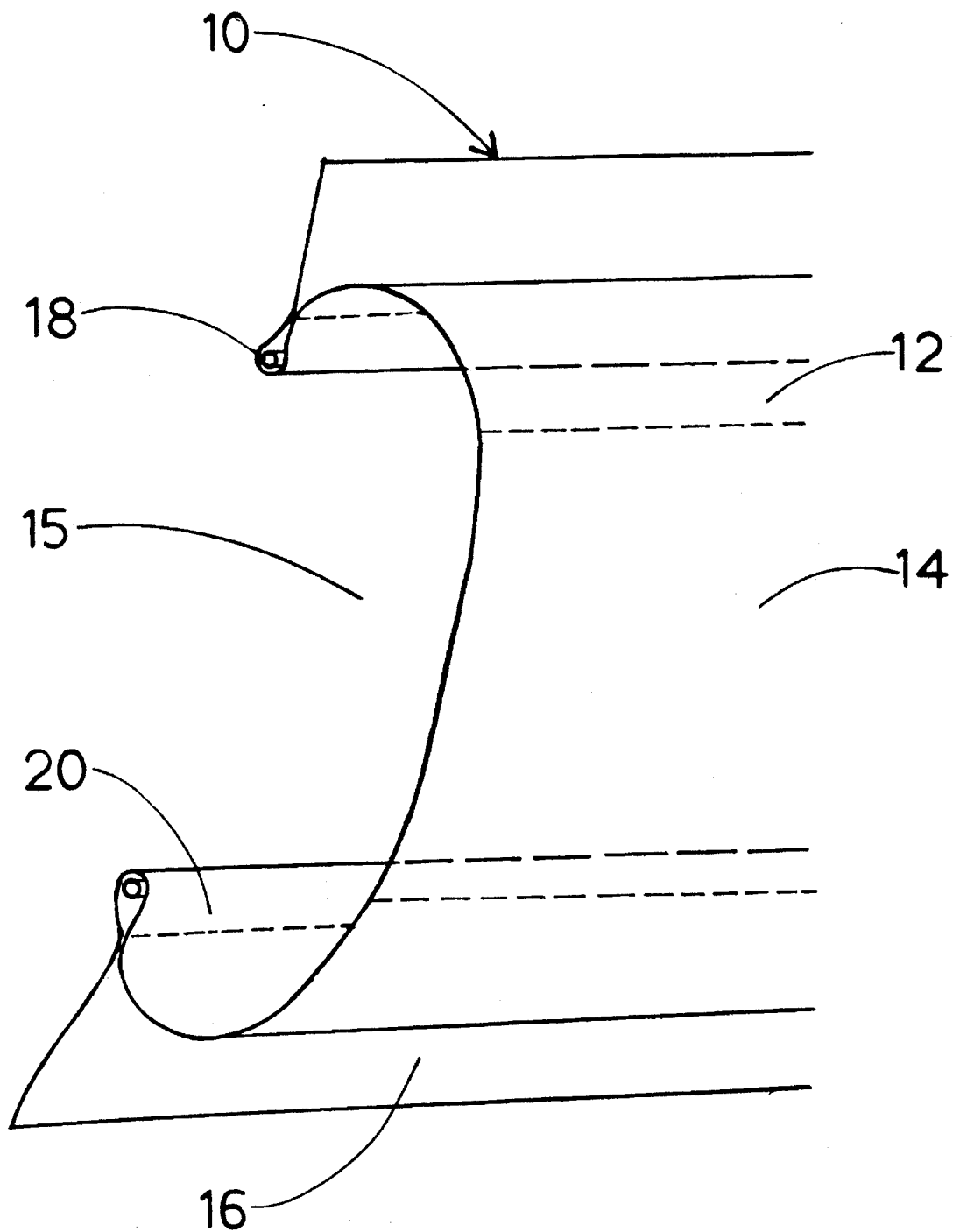
FIG. 4 is a partially cross-sectioned perspective view of the chain cover.

The present invention generally comprises a removable flexible cover assembly for enclosing the drivetrain of a bicycle during storage and transport and protecting the surroundings from contact with the grease and dirt and sharp components of the drivetrain. With regard to FIGS. 1, 2, and 4, the chain cover 10 comprises a bag-like enclosure having an opening 15 that is adapted to be placed about the drivetrain 27 of a bicycle 11. The chain cover 10 includes a continuous sidewall 12 formed of a web of flexible material that is configured as a closed loop. A side panel 14 is joined to one continuous edge of the sidewall 12 to form a bag-like enclosure having an opening 15. The enclosure and opening extend longitudinally in an oblong configuration. Alternatively, the enclosure may be formed by a single piece of flexible material that is gathered or otherwise tailored to form the oblong configuration depicted in the Figures.

The chain cover 10 further includes means for constricting the circumference of the opening 15 to a dimension less than the circumference of the continuous sidewall 12. With regard to FIG. 4, the opening 15 may be provided with an elastic web or cord 18 secured thereto, the elastic cord 18 having a relaxed length substantially less than the corresponding dimension of the opening. The elastic cord 18 is applied particularly at the longitudinally opposed ends of the opening 15, or may extend continuously about the entire opening 15. A hemmed sleeve 20 may be formed at the opening 15 to enclose the elastic cord 18.

The chain cover may further include tabular portions 16 secured to the opening 15 and flaring outwardly therefrom to facilitate manual grasping of the chain cover. The tabular portions 16 may be provided at the longitudinally opposed ends of the cover, or may be formed as a continuous skirt secured about the entire opening 15. The skirt or tabs may be grasped to place or remove the chain cover from a bicycle drivetrain while avoiding grease and din that typically is found on a bicycle drivetrain, and that may accumulate on the interior surfaces of the chain cover 10 itself.

In a further embodiment of the invention, a rigid, U-shaped member 26 may be secured within the sleeve 20 adjacent to the elastic cord 18 at a position selected so that the member 26 engages a portion of the rear stay 13 adjacent to the rear gear assembly 30. The member 26 enables the chain cover to extend about the rear stay 13 without exposing any of the drive chain in the area of the stay 13.

Figure 5:
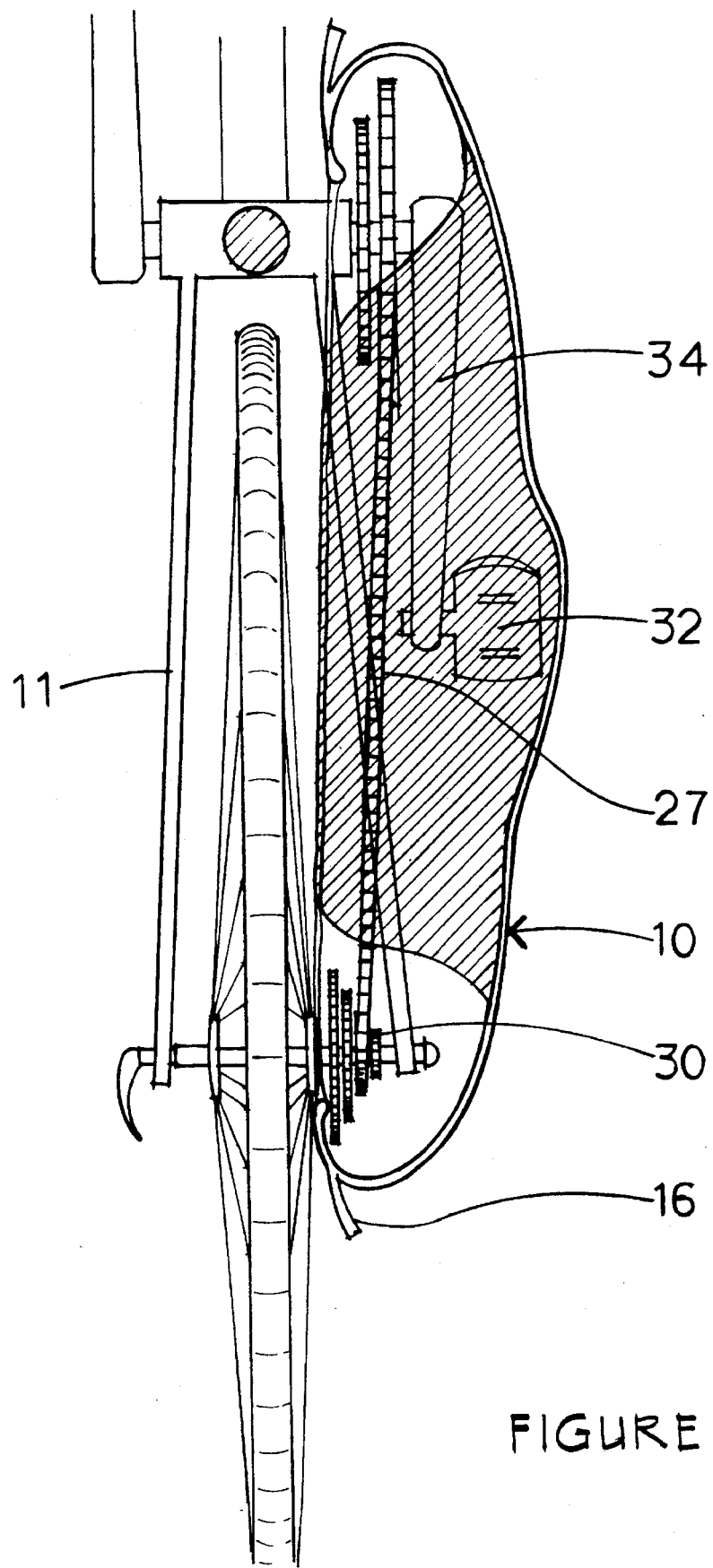
FIG. 5 is a partially cutaway top view of the chain cover secured to the drivetrain of a typical bicycle.

It is significant to note that the chain cover 10 may be employed with a wide variety of bicycle drivetrain configurations, including fixed ratio (single speed) chain drive configurations, front and rear derailers, internal rear hub transmissions, and the like. With regard to FIG. 5, the chain cover is secured by first positioning the right crank 34 generally horizontally so that the right pedal 32 is disposed between the upper leg and lower leg of the chain. The cover is grasped by the skirt 16, one end is stretched and secured about the front or rear gear assembly, and the other end is stretched and secured about the rear or front gear assembly. The skirt 16 is then manipulated to assure that the opening 15 extends about the upper and lower legs of the chain and the rear derailler (if present), and the member 26 extends about the stay 13, thereby enclosing both front and rear gear assemblies and the entire chain. Thus the entire drivetrain is enclosed and protected. Removal of the cover involves the reversal of the process described above.

The cover may be formed of any flexible material, such as, but not limited to, a coated Nylon fabric that is impervious to dirt and grease. This material is ragged and resistant to the sharp gear points of the front and rear gear assemblies, and may be folded or otherwise compressed into a small package for convenient transport and handling. Any grease or dirt contamination is retained on the interior surface of the cover, and the elastic cord 18 deters inverting the cover inside out and prevents exposure of the interior surface.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

LISTING OF REFERENCE NUMERALS

10 Bicycle chain cover of present invention
11 bicycle
13 rear stay
12 sidewall
14 side panel
15 opening of cover
16 tabular portions
18 elastic cord
20 hemmed sleeve
26 U shaped member
27 drivetrain
30 gear assembly
32 pedal
34 crank

What is claimed is:

1. A cover for the chain and front and rear gear assemblies of a drive train of a bicycle, including;
   an imperforate, closed continuous sidewall formed of a flexible fabric and defining an oblong, bag-like enclosure;
   said continuous sidewall having a first continuous edge defining an oblong opening to said enclosure;
   said enclosure having a length greater than the inclusive distance between the front and rear gear assemblies of the drive train of the bicycle and a width greater than the distance between vertically opposed portions of the chain of the drive train of the bicycle;
   a rear portion of said opening adapted to be secured about the rear gear assembly of the drive train of the bicycle and a front portion of said opening adapted to be secured about the front gear assembly of the drive train of the bicycle to enclose said drive train; and,
   means for contracting said opening to a circumferential dimension less that the circumference of said closed continuous sidewall.

2. The cover of claim 1, wherein said sidewall is formed of a flexible fabric material.

3. The cover of claim 1, wherein said means for contracting said opening includes a resilient elastic member extending continuously about said opening, said elastic member comprising an endless closed loop.

4. The cover of claim 3, further including tabular skirt means extending from said first continuous edge for facilitating manual grasping of said enclosure to place said enclosure about said drive train.

5. A cover for the chain and front and rear gear assemblies of a drive train of a bicycle, including;
   a closed continuous sidewall formed of a flexible fabric and defining an oblong, bag-like enclosure;
   said continuous sidewall having a first continuous edge defining an oblong opening to said enclosure;
   said enclosure having a length greater than the inclusive distance between the front and rear gear assemblies of the drive train of the bicycle and a width greater than the distance between vertically opposed portions of the chain of the drive train of the bicycle;
   a rear portion of said opening adapted to be secured about the rear gear assembly of the drive train of the bicycle and a front portion of said opening adapted to be secured about the front gear assembly of the drive train of the bicycle to enclose said drive train;
   means for contracting said opening to a circumferential dimension less that the circumference of said closed continuous sidewall;
   said means for contracting said opening including a resilient elastic member extending continuously about said opening; and,
   a tubular enclosure extending continuously about said opening, said elastic member secured within said tubular enclosure.

6. A cover for the chain and front and rear gear assemblies of a drive train of a bicycle, including;
   a closed continuous sidewall formed of a flexible fabric and defining an oblong, bag-like enclosure;
   said continuous sidewall having a first continuous edge defining an oblong opening to said enclosure;
   said enclosure having a length greater than the inclusive distance between the front and rear gear assemblies of the drive train of the bicycle and a width greater than the distance between vertically opposed portions of the chain of the drive train of the bicycle;
   a rear portion of said opening adapted to be secured about the rear gear assembly of the drive train of the bicycle and a front portion of said opening adapted to be secured about the front gear assembly of the drive train of the bicycle to enclose said drive train;
   means for contracting said opening to a circumferential dimension less that the circumference of said closed continuous sidewall, said means for contracting said opening including a resilient elastic member extending continuously about said opening; and,
   means for facilitating manual grasping of said enclosure to place said enclosure about said drive train, including tab means secured to said opening of said enclosure.

7. The cover of claim 6, wherein said tab means comprises a skirt extending generally continuously about said opening and flaring outwardly therefrom.

8. The cover of claim 7, wherein said skirt is formed of a flexible fabric material.

9. The cover of claim 8, wherein said sidewall and skirt are formed of woven fabric.

10. The cover of claim 9, wherein at least said sidewall is coated with a grease-impermeable substance.

11. A cover for the chain and front and rear gear assemblies of a drive train of a bicycle, including;

a closed continuous sidewall formed of a flexible fabric and defining an oblong, bag-like enclosure;

said continuous sidewall having a first continuous edge defining an oblong opening to said enclosure;

said enclosure having a length greater than the inclusive distance between the front and rear gear assemblies of the drive train of the bicycle and a width greater than the distance between vertically opposed portions of the chain of the drive train of the bicycle;

a rear portion of said opening adapted to be secured about the rear gear assembly of the drive train of the bicycle and a front portion of said opening adapted to be secured about the front gear assembly of the drive train of the bicycle to enclose said drive train;

means for contracting said opening to a circumferential dimension less that the circumference of said closed continuous sidewall; and, rigid insert means secured to said opening and disposed to engage a rear stay tube of the bicycle adjacent to the rear gear assembly.

12. The cover of claim 11, wherein said rigid insert comprises a generally U-shaped member having an opening dimensioned to receive the rear stay tube of the bicycle.

13. A cover for the chain and front and rear gear assemblies of a drive train of a bicycle, including;

a closed continuous sidewall formed of a flexible fabric and defining an oblong, bag-like enclosure;

said continuous sidewall having a first continuous edge defining an oblong opening to said enclosure;

said enclosure having a length greater than the inclusive distance between the front and rear gear assemblies of the drive train of the bicycle and a width greater than the distance between vertically opposed portions of the chain of the drive train of the bicycle;

a rear portion of said opening adapted to be secured about the rear gear assembly of the drive train of the bicycle and a front portion of said opening adapted to be secured about the front gear assembly of the drive train of the bicycle to enclose said drive train;

means for contracting said opening to a circumferential dimension less that the circumference of said closed continuous sidewall; and, wherein said closed continuous sidewall includes a second continuous edge extending in opposed relationship to said first continuous edge, and a side panel having a peripheral edge secured to said second continuous edge.

* * * * *